Patented Nov. 10, 1953

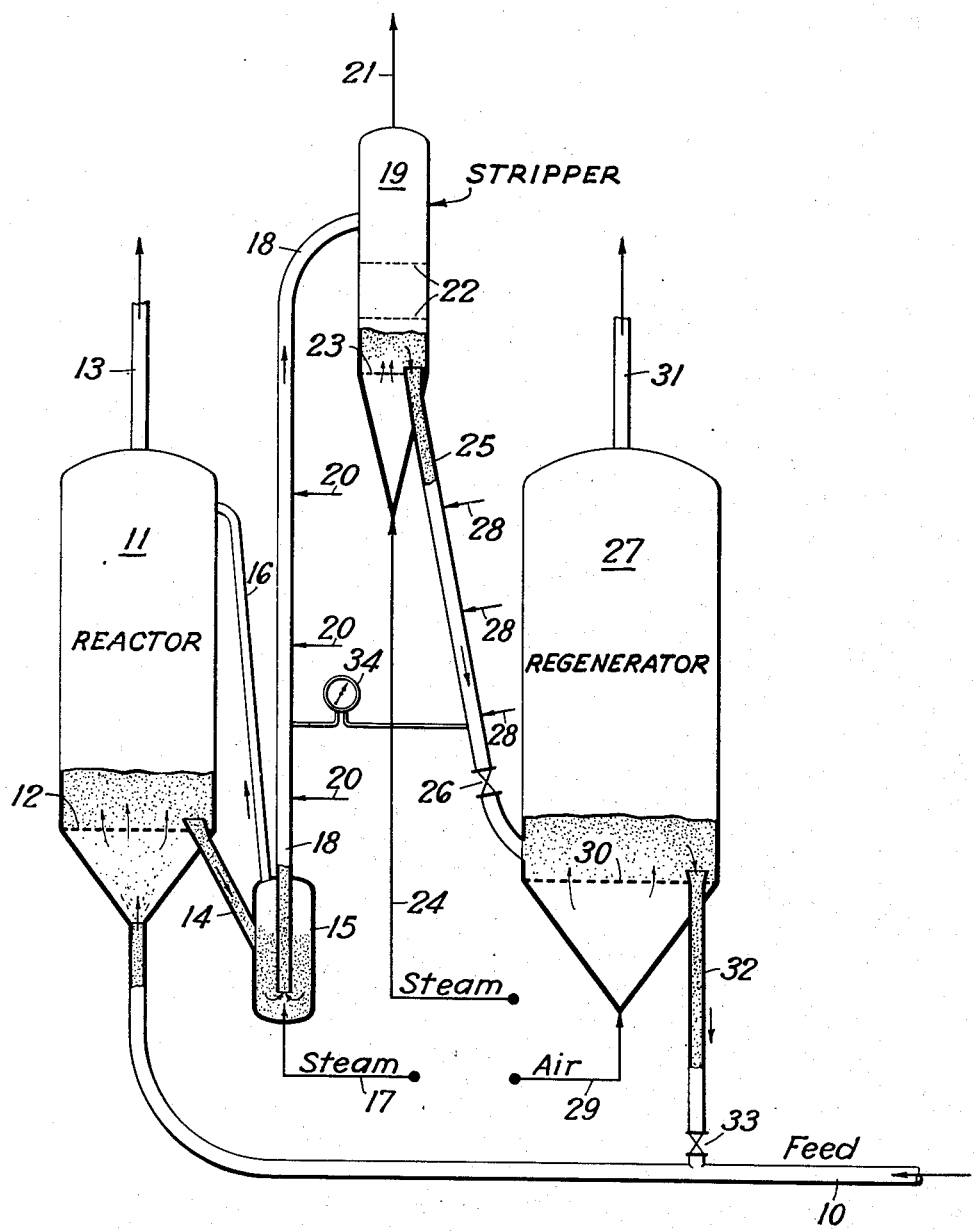

2,658,822

UNITED STATES PATENT OFFICE 2,658,822

FLUIDIZED SOLIDS SYSTEM

Robert J. Hengstebeck, Valparaiso, Ind., assignor to Standard Oil Company, Chicago, Ill., a corporation of Indiana Application August 17, 1949, Serial No. 110,840

4 Claims. (Cl. 23—288)

This invention relates to a method and apparatus for processing hydrocarbon oils and more particularly to the conversion of hydrocarbon oils with fluidized finely divided catalysts. More specifically the invention relates to improvements in the stripping of spent catalyst and to the regulation of pressures within the reactor and the regenerator of a fluid catalytic cracking system. The invention is illustrated by a drawing which shows diagrammatically an apparatus for carrying out the process.

In conventional fluid catalytic cracking units, the reactor and regenerator are usually elevated high above the grade level to permit the use of standpipes beneath them for the purpose of building up fluistatic pressures for catalyst circulation between the vessels. The rates of catalyst flow are usually controlled by the manipulation of slide valves in the standpipes. A sufficient pressure drop is required across the valves to insure that the direction of flow of the catalyst does not become reversed as a result of moderate pressure fluctuations.

Elevation of the reactor and regenerator requires expensive foundations for these heavy vessels and this accounts for a substantial portion of the investment cost in the conventional catalytic cracking unit. One object of my invention is to eliminate these expensive elevated foundations, elevated lines, etc., and locate the reactor and regenerator close to the grade level. Another object of my invention is to increase the effectiveness of stripping of the spent catalyst which is transferred from the reactor to the regenerator. Much effort has been devoted toward obtaining more complete elimination of hydrocarbonaceous material from the spent catalyst before it is subjected to the combustion reaction taking place in the regenerator. The presence on the catalyst of strongly adsorbed hydrocarbons of low volatility has made it very difficult to completely remove them from the spent catalyst, with the result that they become carbonized and burned in the regenerator. This increases the regenerator air requirement considerably, reduces the capacity of the regenerator and in addition represents a material loss of valuable hydrocarbon products.

According to my invention the spent catalyst is subjected to more extensive stripping in standpipes operating in both the diluted dense phase and the dense phase, concurrently and countercurrently respectively. The stripper is also operated at a lower pressure than that of the reactor, thus facilitating stripping of catalyst. Simultaneously with the increased stripping efficiency, I obtain an increase in the pressure of the catalyst stream flowing from the reactor to the regenerator.

Referring to the drawing, hydrocarbon feed stock, suitably gas oil which may be wholly or partially vaporized, is charged by line 10 to the base of reactor 11 where it passes upwardly thru distributing grid 12 and thence thru the turbulent bed of catalyst contained in the reactor and out by vapor line 13 leading to a fractionating system, not shown, for the recovery of gasoline and other products. The catalyst in reactor 11 may be one of several types of cracking catalysts, such as the well known natural catalyst, Super Filtrol, an acid treated montmorillonite clay; or it may be a synthetic catalyst such as silica-alumina, silica-magnesia, etc. The preferred particle size range is of the order of 20 to 100 microns, although somewhat finer and coarser particles may be employed, e. g. 10 to 200 microns. Catalysts in microspherical form also offer advantages.

It has been found that when employing catalyst of this particle size range an upward vapor velocity thru the reactor of about 1 to 2 feet per second is sufficient to maintain the catalyst in fluidized form in a dense suspension having a density of about 20 to 40 pounds per cubic foot. Under these conditions the catalyst forms a mobile fluidized bed, the level of which depends upon the amount of catalyst present and the catalyst density. In a typical commercial cracking unit the level may have a depth of about 5 to 15 feet and a diameter of about 10 to 25 feet. Above the catalyst level there exists a so-called dilute phase usually containing less than one pound of catalyst per cubic foot. To prevent undue loss of catalyst from the reactor it is customary to pass the effluent vapors thru cyclone separators which are frequently located within the upper part of the reaction vessel with dip legs leading back to the dense catalyst phase.

Because of the high turbulence within the reactor, the catalyst composition is substantially uniform thruout the dense phase. Inasmuch as carbon and hydrocarbonaceous materials accumulate on the catalyst in the reactor, a portion of the catalyst is continuously or intermittently withdrawn thru line 14 leading to trap 15 where a portion of the occluded hydrocarbon vapors are allowed to escape by line 16 and return to the upper part of the reactor. Trap 15 is not essential but its use increases the efficiency of vapor separation over that obtainable by passing the dense catalyst stream directly into conduit 18. Stripping gas, preferably steam, is injected into the catalyst by line 17 and reduces the density, causing it to flow upwardly thru conduit 18 leading to stripping tower 19. Additional aeration gas, usually steam, may be injected at one or more points 20. Instead of steam I may use other inert gases for aeration and stripping, e. g. nitrogen, flue gas, $CO_2$, natural gas, cracking still gas, etc. From the top of stripper 19 stripping gases and hydrocarbon vapors are withdrawn by line 21 leading to an absorption system if it is desired to recover the hydrocarbon contents of the gases.

Stripping tower 19 is equipped with suitable baffles 22 and a grid 23 thru which additional stripping gas is injected by line 24 when desired. The grid 23 may be a perforated plate with holes of sufficiently small dimension and aggregate cross sectional area to substantially prevent passage of catalyst downward thru the plate countercurrent to the upwardly flowing current of stripping gases. Baffles 22 may suitably be perforated plates with larger holes to allow catalyst to flow downwardly against a current of upflowing stripping gas. Instead of perforated plates, gratings constructed of metal plates placed edgewise in a honeycomb fashion, similar to the so-called "subway gratings," have been found very effective. Disc and doughnut plates or other suitable baffling devices designed for improving the contact between powdered catalyst and stripping gases can be used.

To increase the efficiency of stripping, it is desirable to heat insulate the chamber 19 and maintain the temperature of the catalyst therein at about the same temperature as the temperature of the reactor 11, e. g. about 900 to 1000° F. If desired the gas supplied by line 24 may be superheated at a temperature above the reaction temperature in order to compensate for heat losses and still more effectively remove from the catalyst hydrocarbonaceous materials of low volatility.

The amount of aeration gas injected by lines 17 and 20 is usually sufficient to reduce the average density of the catalyst in line 18 to about 10 to 30 pounds per cubic foot, the density decreasing as the catalyst expands in rising thru the line, or as additional aeration gas is admitted at lines 20. In the base of stripper 19, however, the catalyst density is substantially higher as a result of the elimination of aeration gases thru line 21. The catalyst density in stripper 19 may be controlled largely by the amount of stripping gas introduced by line 24. In general, it is desirable that the catalyst density be above 25 pounds per cubic foot, and preferably 35 to 50 pounds per cubic foot above plate 23 where it flows out thru standpipe 25. This dense fluidized catalyst enters the top of standpipe 25 and passes downward thru valve 26 and thence into regenerator 27. After the unit has been shut down for a period, or at other times, it is desirable to introduce additional aeration gas into standpipe 25 at one or more points 28. The flow of catalyst downward thru standpipe 25 can be controlled by valve 26 to maintain in 19 a high catalyst level for adequate stripping.

As the catalyst flows downward thru standpipe 25 a substantial increase in pressure results from the fluistatic effect of the catalyst in the vertical column and the amount of the pressure thus developed can be increased by elevating the stripping chamber 19 to any elevation desired. Thus if the average elevation of the chamber 19 is 100 feet and the pressure differential between the catalyst columns 18 and 25 is 0.25 p. s. i. per foot, resulting from an average density difference of about 36 pounds per cubic foot, then the pressure on the catalyst would be increased 25 p. s. i. in flowing from the reactor to the regenerator, assuming no pressure loss from friction in the system. By placing the stripper 19 at still higher elevation, e. g. 200 feet, yet higher pressures can be generated for cycling catalyst thru the system. It is usually desirable to place the stripper 19 above the level of the reactor and the regenerator. It will be seen that in my system, the regenerator pressure will always be above the reactor pressure as a result of the difference in density of catalyst in the two legs of the stripper 19. A pressure differential of about 5 to 20 p. s. i. is usually desirable. This differential pressure provides the driving force for catalyst circulation, overcoming resistance in the lines, vessels and control valves, which largely control rate of circulation. Rate of catalyst circulation is also partly controllable thru regulation of the relative densities of catalyst in lines 18 and 25.

The stripped catalyst containing 1 to 10 per cent of carbonaceous deposits, usually about 2 to 6 per cent, enters the regenerator 27 and is contacted therein with regeneration air introduced by line 29 and distributed by grid 30. The temperature of the regenerator is ordinarily about 50 to 200° F. above the reaction temperature, e. g. about 1000 to 1100° F. Under these conditions with sufficient upward air velocity to maintain the catalyst in fluidized form in the regenerator, the carbon deposits are largely burned off and the spent regeneration gases are conducted to the flue by line 31. Cyclone separators, not shown, are usually employed to recover as much catalyst as possible from the regeneration gases and these are sometimes supplemented with electrostatic precipitators. The density of the catalyst in the regenerator is commonly maintained about the same as that in the reactor, i. e. about 20 to 40 pounds per cubic foot.

After a substantial part of the carbon has been burned from the catalyst, leaving, for example, about 0.5%, the catalyst is conducted by line 32 thru valve 33 and into the stream of hydrocarbon feed stock flowing thru line 10. The hot catalyst serves to heat the feed stock to cracking temperature and it is frequently possible to obtain all heat required for the cracking reaction in this way. The ratio of catalyst-to-feed stock is frequently about 3 to 10 parts of catalyst by weight for each part of hydrocarbon oil charged.

It will be noted that the catalyst flows from the dense phase in the reactor to the dense phase in the regenerator, the catalyst being conducted thru a portion of its path partly in the form of a diluted phase of lower density, expanding as it flows upwardly to the stripper. This expansion of the catalyst is believed to considerably facilitate the elimination of hydrocarbonaceous substance adsorbed thereon.

Various means may be employed for controlling the operation of the reactor-stripper-regenerator system. One of the simplest methods of control is by means of a differential pressure gage 34 connected between trap 15 and the bottom of standpipe 25. The amount of aeration gas introduced at 17, 20 and 28 may be manually or automatically adjusted to maintain a constant pressure differential between these two points in the system. Constant level devices may also be employed in the reactor, stripper and regenerator to maintain catalyst level therein.

It is desirable to maintain a pressure in the regenerator above the pressure in the reactor in order to facilitate the transfer of catalyst from the regenerator to the reactor either directly or thru the charging stock feed line 10 as shown in the drawing. Generally it is not necessary to maintain the regeneration pressure more than 5 p. s. i. above the reactor pressure. Thus in a typical operation of reactor may be operated at a pressure of 10 p. s. i. with a regenerator pressure of 15 p. s. i. The five pound pressure differential obtained in this way is sufficient for satisfactory operation of catalyst-control valve 33. As hereinbefore described, the pressure differential between the reactor and the regenerator is continuously maintained by the pressure established by standpipe 25 added to the pressure of the catalyst columns in stripper 19 and downcomer 14, less the fluistatic pressure of column 18 and less the pressure drop across valve 26.

It is not always necessary to introduce additional stripping gas into stripper 19, e. g. by line 24, but all the stripping may be effected by the aeration gas introduced into columns 18 and 25. However, for effective stripping it is desirable to take advantage of the countercurrent stripping action of stripper 19.

Having thus described my invention what I claim is:

1. An apparatus for contacting fluids with a fluidized finely divided solid omprising a first contactnig chamber, a stripping chamber and a second contacting chamber, said stripping chamber being elevated above said first and second contacting chambers, a conduit leading downwardly from a low point in said first chamber to a solids trap, a vapor transfer line extending between an upper part of said trap and an upper part of said first chamber, a conduit leading upwardly from a low point in said solids trap to a high point in said stripping chamber, a standpipe leading downwardly from a low point in said stripping chamber to a low point in said second chamber, means for introducing a carrier aeration gas into said conduit between said trap and said stripping chamber, means for introducing stripping gas into said stripping chamber below the solids outlet of said stripping chamber, means for withdrawing stripping gas and stripped fluids from said stripping chamber, a conduit for charging a first reactant fluid to the base of said first chamber, a conduit for withdrawing the said first contacting fluid from the top of said first chamber, means for introducing a second reactant into the base of said second chamber, a conduit for withdrawing spent contacting fluid from the top of said second chamber, and means for conducting solids from a low point in said second chamber to a low point in said first chamber.

2. Apparatus for the treatment of materials in the vapor phase with a fluidized solid catalyst of small particle size which comprises in combination a reactor, means for distributing introduced gasiform material at a plurality of points near the bottom of said reactor, a stripper above the upper level of the reactor, a regenerator at the side of and at substantially the same level as the reactor and at a lower level than said stripper, a catalyst trap below the level of said distributing means, a first downwardly directed conduit communicating at its upper end with the reactor just above said distributing means and discharging at its lower end into said catalyst trap, a vertical conduit extending from said catalyst trap to an upper level in said stripper, means for introducing a lift gas into said trap for conveying catalyst therefrom to the upper part of said stripper, means for introducing stripping gas at the base of said stripper, a second downwardly extending conduit with an upper end communicating with the lower part of the stripper above the base thereof and with its lower end communicating with the lower part of said regenerator, means for distributing regenerating gas at a plurality of spaced points at the base of said regenerator, a third downwardly extending conduit with its upper end communicating with a low point in the regenerator spaced from the discharge end of said second conduit and with its lower end communicating with an inlet conduit which leads to the reactor, and separate means for withdrawing gasiform streams from the top of the reactor, stripper and regenerator respectively.

3. The apparatus of claim 2 which includes a conduit for returning to the upper part of the reactor gases liberated from catalyst transferred from the reactor to the trap by the first downwardly directed conduit.

4. A fluidized solids contacting system which comprises a reactor, a distributor grid at the base of said reactor, a solids trap below the level of said distributor grid, a first downwardly extending conduit leading from a point in the reactor just above the distributor grid to said trap, a stripper at a higher level than the reactor, a substantially vertical conduit leading from said trap to the upper part of the stripper, means for introducing lift gas into the trap for conveying solids therefrom through said vertical conduit to the upper part of the stripper, means for returning to the upper part of the reactor at least a part of the gas liberated from solids withdrawn from the reactor, means for introducing stripping gas at the base of the stripper, a regenerator adjacent the reactor and below the level of the stripper, a second downwardly extending conduit leading from a point above but near the base of the stripper to the lower part of the regenerator, a control valve in said second downwardly extending conduit, means for introducing aerating gas into said second downwardly extending conduit, means for introducing regeneration gas at the base of said regenerator and for distributing said gas below the inlet of the second downwardly extending conduit, a third downwardly extendng conduit with its upper end communicating with the lower part of the regenerator above the distributing means and spaced from the inlet end of the second downwardly extending conduit, a control valve in the lower part of said third downwardly extending conduit, an inlet conduit communicating with the bottom of the third downwardly extending conduit and the lower part of the reactor, and separate means for withdrawing gasiform streams from said reactor, stripper and regenerator respectively.

ROBERT J. HENGSTEBECK.

References Cited in the file of this patent

UNITED STATES PATENTS

| Number | Name | Date |
|---|---|---|
| 2,408,943 | Mekler | Oct. 8, 1946 |
| 2,421,616 | Hemminger et al. | June 3, 1947 |
| 2,444,832 | Krebs | July 6, 1948 |
| 2,446,247 | Scheineman | Aug. 3, 1948 |
| 2,447,116 | Collins | Aug. 17, 1948 |
| 2,465,255 | Moorman | Mar. 22, 1949 |
| 2,471,064 | Hall et al. | May 24, 1949 |
| 2,476,143 | Gullette | July 12, 1949 |
| 2,493,454 | Hagy | Jan. 3, 1950 |